(12) United States Patent
Tran

(10) Patent No.: US 8,234,326 B2
(45) Date of Patent: **\*Jul. 31, 2012**

(54) PROCESSOR CORE AND MULTIPLIER THAT SUPPORT BOTH VECTOR AND SINGLE VALUE MULTIPLICATION

(75) Inventor: Chinh N. Tran, Palo Alto, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 1429 days.

This patent is subject to a terminal disclaimer.

(21) Appl. No.: 11/121,945

(22) Filed: May 5, 2005

(65) Prior Publication Data

US 2006/0253520 A1    Nov. 9, 2006

(51) Int. Cl.
*G06F 7/52* (2006.01)
(52) U.S. Cl. ........................................ 708/620
(58) Field of Classification Search .................. 708/490, 708/495, 520, 523, 607, 620–656
See application file for complete search history.

(56) References Cited

U.S. PATENT DOCUMENTS

| | | | |
|---|---|---|---|
| 5,144,576 A | 9/1992 | Briggs et al. | |
| 5,889,692 A | 3/1999 | Wolrich et al. | |
| 6,026,483 A * | 2/2000 | Oberman et al. | 712/221 |
| 6,038,583 A * | 3/2000 | Oberman et al. | 708/628 |
| 6,131,107 A | 10/2000 | Wolrich et al. | |
| 6,377,970 B1 * | 4/2002 | Abdallah et al. | 708/603 |
| 6,463,453 B1 | 10/2002 | Dang | |
| 6,571,268 B1 * | 5/2003 | Giacalone et al. | 708/524 |
| 6,711,602 B1 * | 3/2004 | Bhandal et al. | 708/625 |
| 7,062,526 B1 * | 6/2006 | Hoyle | 708/620 |
| 7,167,890 B2 * | 1/2007 | Lin et al. | 708/625 |
| 2001/0023425 A1 * | 9/2001 | Oberman et al. | 708/620 |
| 2003/0055860 A1 | 3/2003 | Giacalone et al. | |
| 2004/0055860 A1 | 3/2004 | Huseman et al. | |
| 2004/0059771 A1 * | 3/2004 | Wang | 708/625 |
| 2004/0267857 A1 * | 12/2004 | Abel et al. | 708/524 |
| 2006/0253519 A1 | 11/2006 | Tran | |

OTHER PUBLICATIONS

Hamacher, Vranesic and Zaky, "Computer Organization", 5th Edition, McGraw-Hill, pp. 380-390 (2002).
Poornaiah, D.V. et al., "Design and VLSI Implementation of a Novel Concurrent 16-bit Multiplier-Accumulator for DSP Applications," IEEE, 1993, pp. I-385 to I-388.
Office Communication, dated Jul. 24, 2008, for U.S. Appl. No. 11/122,004, filed May 5, 2005, 9 pages.
Office Communication, dated Jan. 6, 2009, for U.S. Appl. No. 11/122,004, filed May 5, 2005, 10 pages.
Office Communication, dated Jun. 23, 2009, for U.S. Appl. No. 11/122,004, filed May 5, 2005, 10 pages.
Office Communication, dated Dec. 3, 2009, for U.S. Appl. No. 11/122,004, filed May 5, 2005, 11 pages.

\* cited by examiner

*Primary Examiner* — Tan V. Mai
(74) *Attorney, Agent, or Firm* — Sterne, Kessler, Goldstein & Fox P.L.L.C.

(57) ABSTRACT

The present invention provides processing systems, apparatuses, and methods that support both general processing processor (GPP) and digital signal processor (DSP) features, such as vector and single value multiplication. In an embodiment, fractional arithmetic, integer arithmetic, saturation, and single instruction multiple data (SIMD) operations such as vector multiply, multiply accumulate, dot-product accumulate, and multiply-subtract accumulate are supported. In an embodiment, the process core and/or multiplier multiplies vector values or single values by creating partial products for each desired product. These partial products are added to produce intermediate results, which are combined in different ways to support various GPP and DSP operations.

22 Claims, 11 Drawing Sheets

| 31 | 26 | 25 | 21 | 20 | 16 | 15 | | 6 | 5 | 0 |
|---|---|---|---|---|---|---|---|---|---|---|
| 000000 | | rs | | rt | | 0 | | | MULT 011000 | |
| 6 | | 5 | | 5 | | 10 | | | 6 | |

FIG. 8A

| 31 | 26 | 25 | 21 | 20 | 16 | 15 | 11 | 10 | 6 | 5 | 0 |
|---|---|---|---|---|---|---|---|---|---|---|---|
| SPECIAL 3 011111 | | rs | | rt | | 0 | ac | MAQ S/SA 10110/010 | | DPAQ.W.PH 110000 | |
| 6 | | 5 | | 5 | | 5 | | 5 | | 6 | |

FIG. 8B

| 31 | 26 | 25 | 21 | 20 | 16 | 15 | 11 | 10 | 6 | 5 | 0 |
|---|---|---|---|---|---|---|---|---|---|---|---|
| SPECIAL 3 011111 | | rs | | rt | | rd | | MULQ_RS 11111 | | ADDU.QB 010000 | |
| 6 | | 5 | | 5 | | 5 | | 5 | | 6 | |

FIG. 8C

| 31 | 26 | 25 | 21 | 20 | 16 | 15 | 11 | 10 | 6 | 5 | 0 |
|---|---|---|---|---|---|---|---|---|---|---|---|
| SPECIAL 3 011111 | | rs | | rt | | 0 | ac | DPAU.H.QBL 00011 | | DPAQ.W.PH 110000 | |
| 6 | | 5 | | 5 | | 5 | | 5 | | 6 | |

FIG. 8D

| 31 | 26 | 25 | 21 | 20 | 16 | 15 | 11 | 10 | 6 | 5 | 0 |
|---|---|---|---|---|---|---|---|---|---|---|---|
| SPECIAL 3 011111 | | rs | | rt | | 0 | ac | MULSAQ_S 00110 | | DPAQ.W.PH 110000 | |
| 6 | | 5 | | 5 | | 5 | | 5 | | 6 | |

FIG. 8E

| 31 | 26 | 25 | 21 | 20 | 16 | 15 | 11 | 10 | 6 | 5 | 0 |
|---|---|---|---|---|---|---|---|---|---|---|---|
| SPECIAL 3 011111 | | rs | | rt | | 0 | ac | DPSU.W.QBL 01011 | | DPAQ.W.PH 110000 | |
| 6 | | 5 | | 5 | | 5 | | 5 | | 6 | |

FIG. 8F

| 31 | 26 | 25 | 21 | 20 | 16 | 15 | 11 | 10 | 6 | 5 | 0 |
|---|---|---|---|---|---|---|---|---|---|---|---|
| SPECIAL 3 011111 | | rs | | rt | | 0 | ac | MULEU_S 00110 | | ADDU.QB 010000 | |
| 6 | | 5 | | 5 | | 5 | | 5 | | 6 | |

FIG. 8G

PROCESSOR CORE AND MULTIPLIER THAT SUPPORT BOTH VECTOR AND SINGLE VALUE MULTIPLICATION

CROSS REFERENCE TO RELATED APPLICATIONS

This application is related to commonly owned, co-pending U.S. application Ser. No. 11/122,004, filed on the same date herewith, entitled "Processor Core And Multiplier That Supports A Multiply And Subtract Operation By Utilizing Inverted Booth Recoding," which is incorporated herein by reference in its entirety.

FIELD OF THE INVENTION

The present invention relates generally to processor cores and multipliers that are capable of supporting both vector and single value multiplication.

BACKGROUND OF THE INVENTION

Traditionally, the functionality of general purpose processors (GPPs) and digital signal processors (DSPs) have been implemented separately as individual processors. But, as modern applications, for example, DVD recorders, cable set-top boxes, VoIP systems, and MP3 players demand both general purpose processing and digital signal processing capabilities, and as GPPs become faster, the trend has been to converge the functionality of GPPs and DSPs into a single processor.

BRIEF SUMMARY OF THE INVENTION

The present invention provides processing systems, apparatuses, and methods that support both GPP and DSP features, such as vector and single value multiplication. In an embodiment, the present invention supports fractional arithmetic, integer arithmetic, saturation, and SIMD (Single Instruction Multiple Data) operations such as vector multiply, multiply accumulate, dot-product accumulate, multiply-difference accumulate, and dot-product subtract accumulate.

In an embodiment, the present invention multiplies vector values or single values by creating partial products for each desired product. These partial products are added by hardware components to produce intermediate results, which are combined in different ways to support various GPP and DSP operations.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 8A-8G are diagrams illustrating various instructions that can be implemented by the processor core of FIG. 1.

The present invention will be described with reference to the accompanying drawings. The drawing in which an element first appears is typically indicated by the leftmost digit(s) in the corresponding reference number.

DETAILED DESCRIPTION OF THE INVENTION

The present invention provides processing systems, apparatuses, and methods that support both GPP and DSP features, such as vector and single value multiplication. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
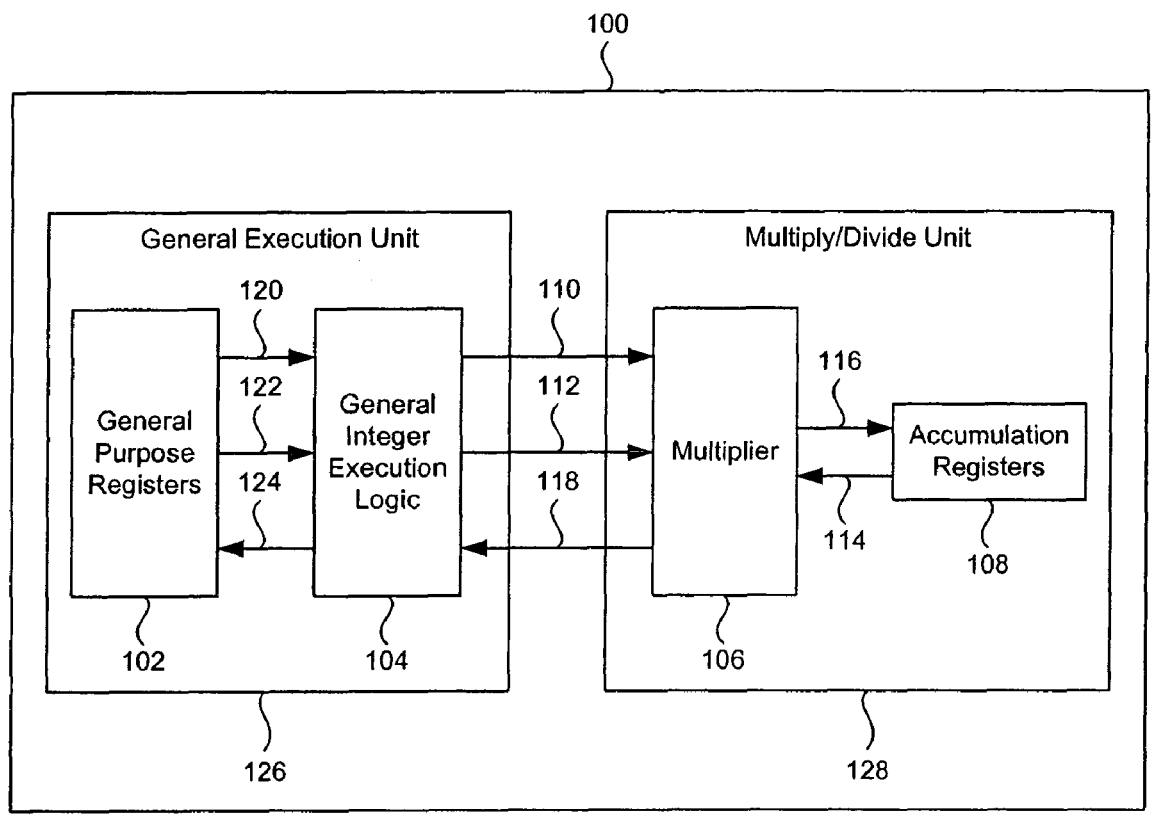
FIG. 1 is a schematic diagram of a processor core according to an embodiment of the present invention.

FIG. 1 is a schematic diagram of a processor core 100 according to an embodiment of the present invention. Processor core 100 includes a general execution unit 126 and a multiply/divide unit 128. General execution unit 126 includes a set of general purpose registers (GPRs) 102 and a general integer execution logic 104. Multiply/divide unit 128 includes logic for a multiplier 106, logic for performing division (not shown) and a set of accumulation registers 108. Multiplier 106 supports a variety of operands representing both vectors and single values.

In an embodiment, GPRs 102 provide operands 120 and 122 (e.g., the values in a first and second register) to general integer execution logic 104. For operations that require multiplication or division, general integer execution logic 104 passes values represented by operands 120 and 122 to multiply/divide unit 128 as operands 110 and 112. Multiplier 106 receives operands 110 and 112 and an operand 114 from one of accumulation registers 108 and generates a result 116 or 118. Result 116 is stored in one of accumulation registers 108. Result 118 is passed to general integer execution logic 104, which is then passed to GPRs 102 as result 124 and stored in a register of GPRs 102.

Figure 2A:
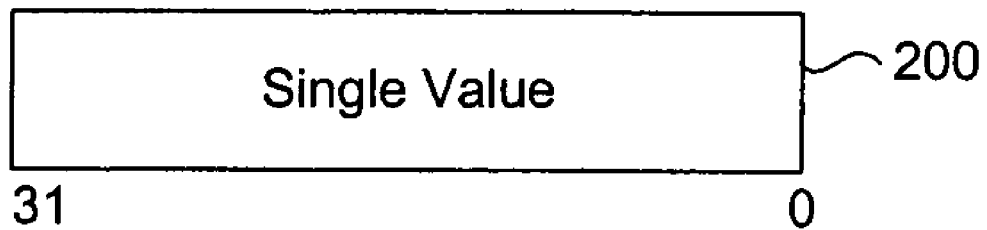
FIG. 2A-2B are diagrams illustrating how a vector and a single value are represented as a 32-bit operand.
Figure 2B:
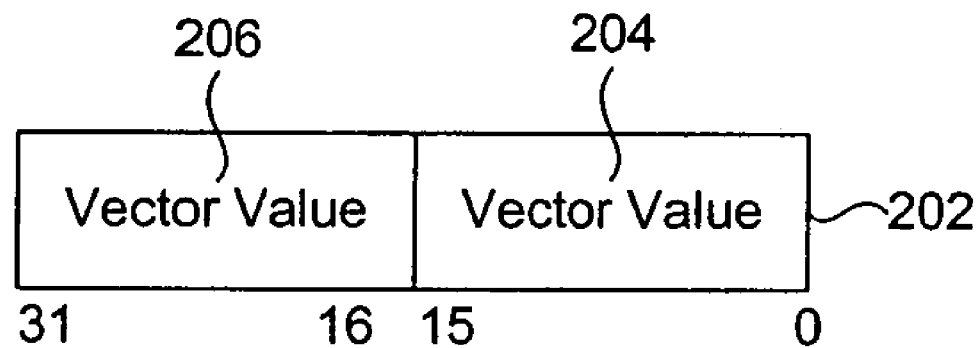

FIG. 2A is diagram illustrating how a single value is represented as a 32-bit operand. All 32-bits of operand 200 are reserved to represent a value, for example, single signed or unsigned 8-bit, 16-bit, or 32-bit integer value, as well as a 16-bit fractional (Q15) or 32-bit fractional (Q31) value. FIG. 2B is a diagram illustrating how a vector is represented as a 32-bit operand. Bits 0 to 15 of operand 202 are reserved to represent a right vector value 204 and bits 16 to 31 are reserved to represent a left vector value 206. Vector values 204 and 206 may each be, for example, a signed or unsigned 8-bit or 16-bit integer value or a 16-bit fractional (Q15) value. As would be appreciated by persons skilled in the relevant art, different formats as well as different sized operands may be used with the present invention to represent both vectors and single values. Furthermore, as would be appreciated by persons skilled in the relevant art, different data types may be used to represent vector values and single values.

Referring to FIG. 1 again, Multiplier 106 supports a variety of operations that operate on vectors and single values such as those illustrated by FIGS. 2A and 2B. For example, multiplier 106 may support a multiply (MULT) instruction wherein multiplier 106 multiplies two 32-bit integer single values represented by operands 110 and 112 to produce a 64-bit result 116. The result 116 is stored, for example, in one of accumulation registers 108. Multiplier 106 also supports a multiply and accumulate (MAQ) instruction wherein multiplier 106 multiplies two Q15 single values represented by operands 110 and 112 to produce a Q31 value. This value may be added with a value represented by operand 114 to produce a 64-bit result 116 that is stored in one of accumulation registers 108.

In an embodiment, multiplier 106 supports SIMD (Single Instruction Multiple Data) operations.

Figure 3A:
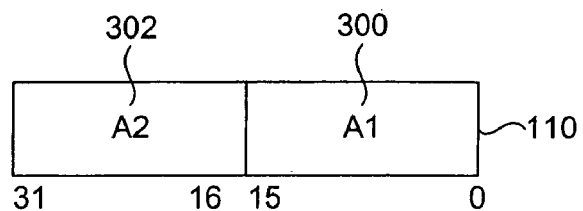
FIGS. 3A-3D are diagrams illustrating SIMD (Single Instruction Multiple Data) operations that are supported by the processor core of FIG. 1.
Figure 3A:
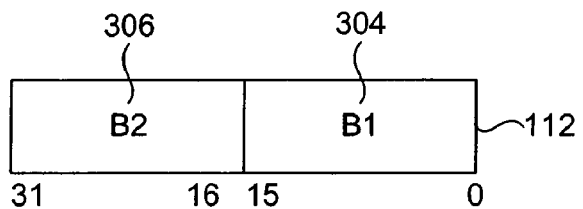
Figure 3A:
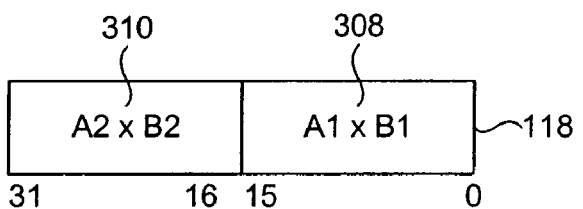
Figure 3B:
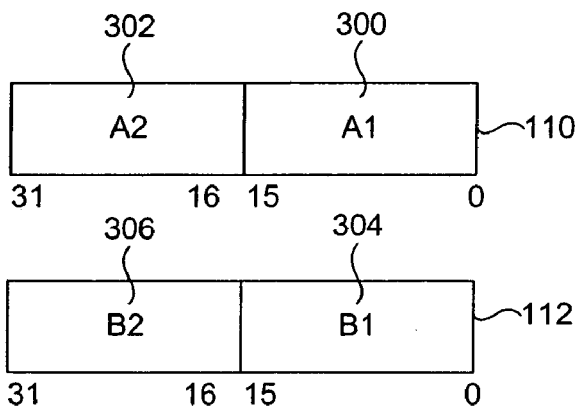
Figure 3B:
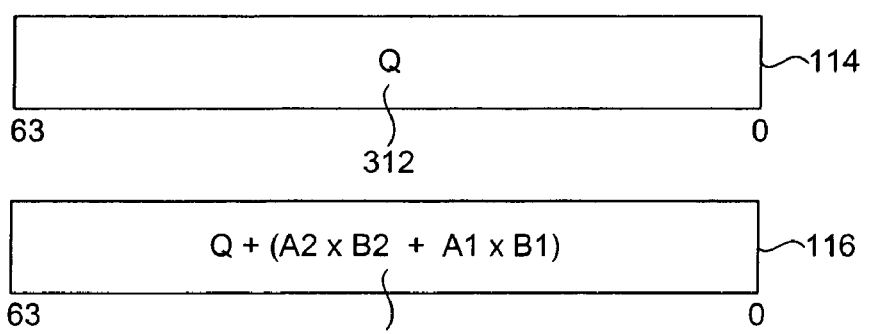
Figure 3C:
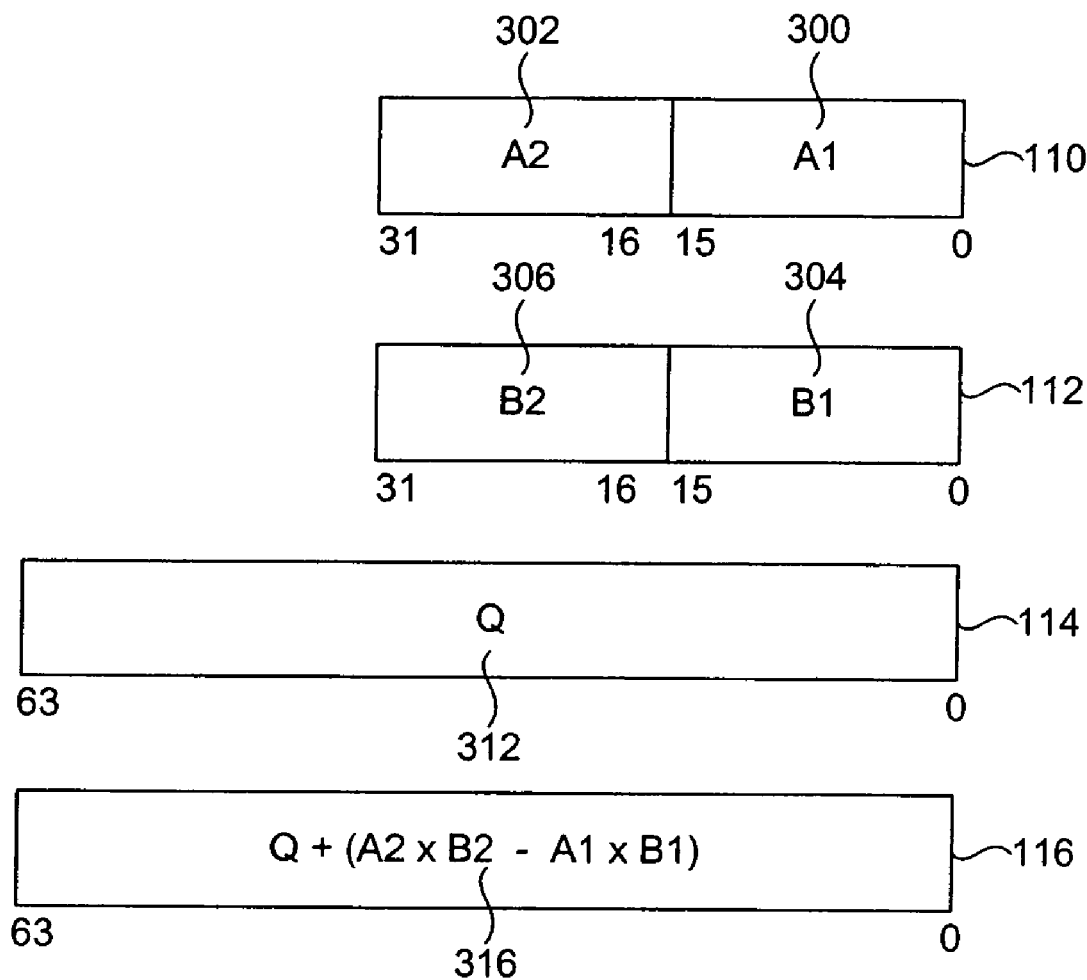
Figure 3D:
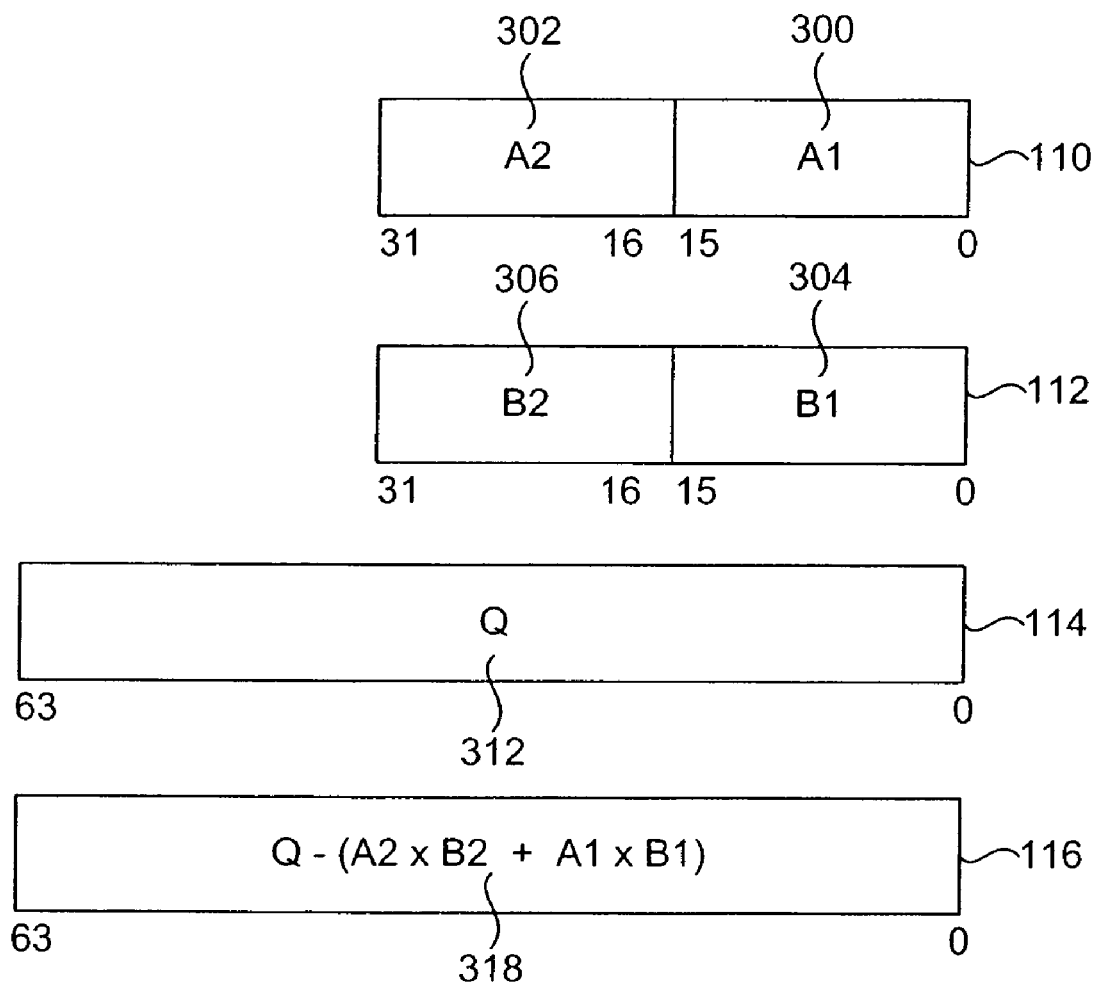

FIGS. 3A-3D are diagrams illustrating SIMD (Single Instruction Multiple Data) operations that are supported by processor core 100. FIG. 3A is a diagram illustrating a multiply vector SIMD instruction (MULQ). Operands 110 and 112 each hold vectors containing two Q15 values (i.e. values 300, 302, 304, and 306). To perform a MULQ operation, multiplier 106 multiplies right vector values 300 and 304 to produce right vector value 308 of result 118. Multiplier 106 multiplies left vector values 302 and 304 to produce left vector value 310 of result 118. FIG. 3B is a diagram illustrating a dot-product accumulate SIMD instruction (DPA). To perform a DPA operation, multiplier 106 sums the product of right vector values 300 and 304, the product of left vector values 302 and 306, and value 312 represented by operand 114 to generate value 314 of result 116. FIG. 3C is a diagram illustrating a multiply-difference accumulate SIMD instruction (MULSAQ). To perform a MULSAQ operation, multiplier 106 sums the negative value of the product of right vector values 300 and 304, the product of left vector values 302 and 306, and value 312 represented by operand 114 to generate value 316 of result 116. FIG. 3D is a diagram illustrating a dot-product subtract accumulate operation (e.g., DPS). To perform a DPS operation, multiplier 106 subtracts the sum of the product of right vector values 300 and 304 and the product of left vector values 302 and 306 from value 312 represented by operand 114 to generate value 318 of result 116. Embodiments of the present invention can support additional SIMD instructions.

Figure 4:
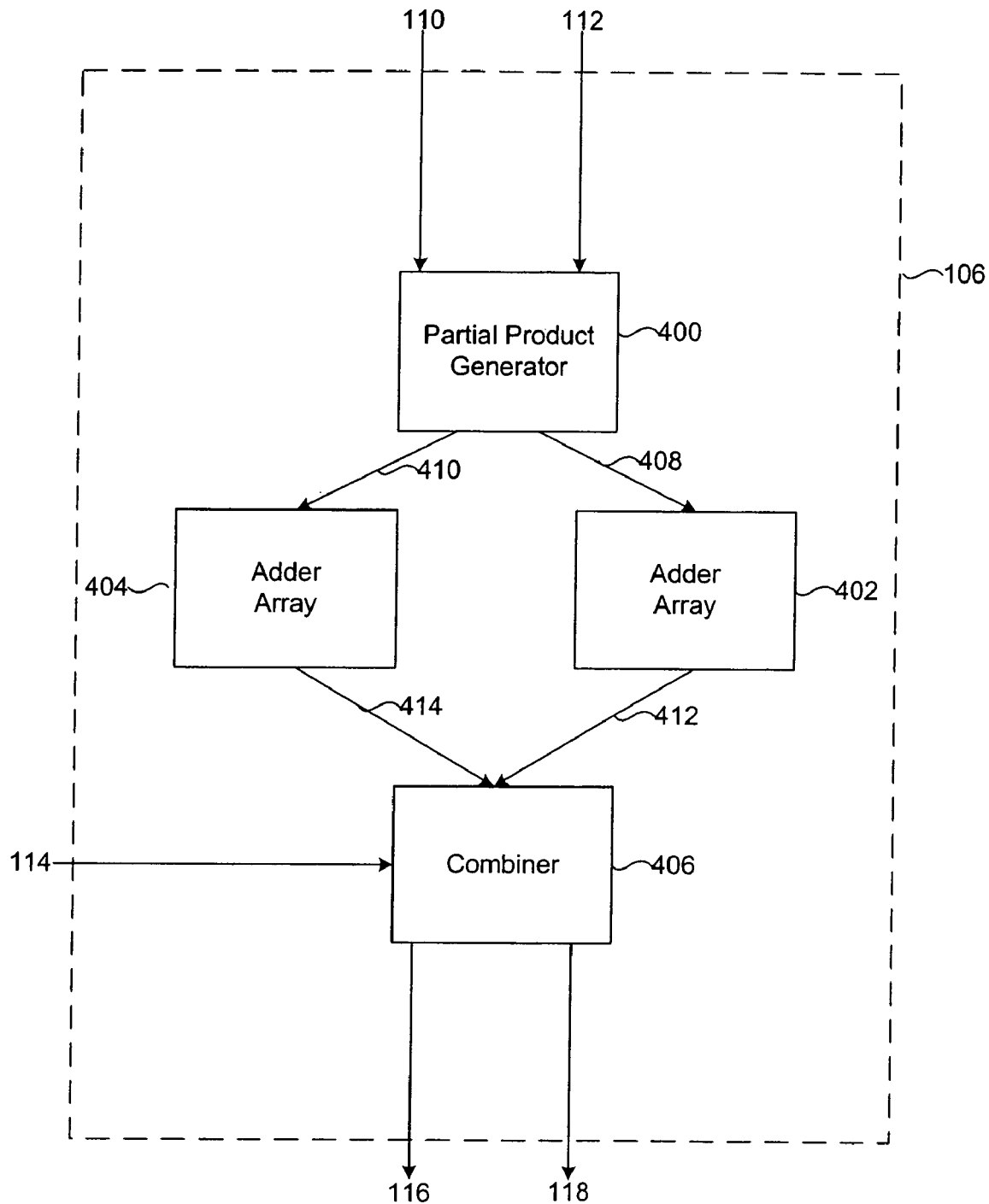
FIG. 4 is a more detailed schematic diagram of the multiplier of FIG. 1.

FIG. 4 is a more detailed schematic diagram of multiplier 106. Multiplier 106 includes a partial product generator 400, adder arrays 402 and 404 and a combiner 406.

Partial product generator 400 receives operands 110 and 112 and generates sets of partial products 408 and 410. When operands 110 and 112 represent vectors, partial product generator 400 generates sets 408 and 410 such that the sum of the partial products in set 408 equals the product of the right vector values and the sum of partial products in set 410 equals the product of the left vector values. When operands 110 and 112 each represent a single value, partial product generator 400 generates sets 408 and 410 such that the sum of all the partial products in both sets equals the product of the single values.

Adder arrays 402 and 404 sum the partial products generated by partial product generator 400. Adder array 402 receives and adds the partial products in set 408 to generate a result 412. Likewise, adder array 404 receives and adds the partial products in set 410 to generate a result 414. When adder arrays 402 and 404 are implemented, for example, using carry-save adders, results 412 and 414 each contain two values, the carry and the save of the carry-save addition. In an embodiment that uses for example ripple-adders or carry-lookahead adders, results 412 and 414 each represent a single value, the sum of the partial products in sets 408 and 410, respectively. Adder arrays 402 and 404 may be implemented using a variety of different adders and is not limited to being implemented using just ripple-adders, carry-lookahead adders, and/or carry-save adders.

As noted herein, results 412 and 414 represent either products of vector values or partial sums of the product of single values. In an embodiment, this is possible because partial product generator 400 provides partial products for the product of right vector values to adder array 402 and provides partial products of left vector values to adder array 404. Hence, combiner 406 can produces different final results 116 and 118 by combining results 412, 414, and value represented by operand 114 in various ways. When operands 110 and 112 each represent a single value, the combiner 406 can add result 412, result 414, and optionally the value of operand 114 to generate result 116, thereby supporting operations such as MULT and MAQ. When operands 110 and 112 represent vectors, combiner 406 combines results 412 and 414 to generate a vector for result 118, thereby supporting MULQ type operations. Furthermore, when operands 110 and 112 represent vectors, combiner 406 adds and subtracts results 412, result 414, and the value represented by operand 114 to provide result 116, thereby supporting DPA, MULSAQ, and DPS type operations.

In an embodiment, combiner 406 provides support for fractional values. Fractional values are used to represent a range of +1 to −1. For fractional values encoded as two's complement fixed-point integer values, the full range of integer values (i.e., −32768 to 32767 for a 16-bit integer) are generally used to represent the range +1 to −1 as closely as possible. Hence, when a fractional number is represented as a 16-bit integer, the value 0x8000 (−32768) is generally used to represent −1 and the value 0x7FFF (32767) is generally used to represent 0.999999. Using this scheme, it is not possible to represent +1 since +32768 cannot be represented in two's complement 16-bit integer format. When two fractional values, which are represented as two's complement fixed-point integers, are multiplied together utilizing integer multiplier, the result must be shifted by one bit in the direction of the most significant bit to align the decimal point of the fractional product. Hence, when operands 110 and 112 represent vector values or single values that are 32-bit fractional (Q31) or 16-bit fractional (Q15) numbers, combiner 406 shifts results of 412 and/or 414 to properly align the decimal point of the resulting fractional products.

In an embodiment, combiner 406 provides saturation support for fractional values. Since a two's complement fixed-point integer representation of fractional values is able to represent values between +1 and −1 exclusively and −1, an overflow condition arising from the multiplication of two fractional values can occur only when two fractional values are equal to −1. When fractional values in the operands 110 and 112 are detected such that multiplication of those values will result in a fractional overflow, combiner 406 saturates the result 412 and/or 414 so that the result of the fractional multiplication is as close to 1 as possible (i.e., 0.999999).

Figure 5A:
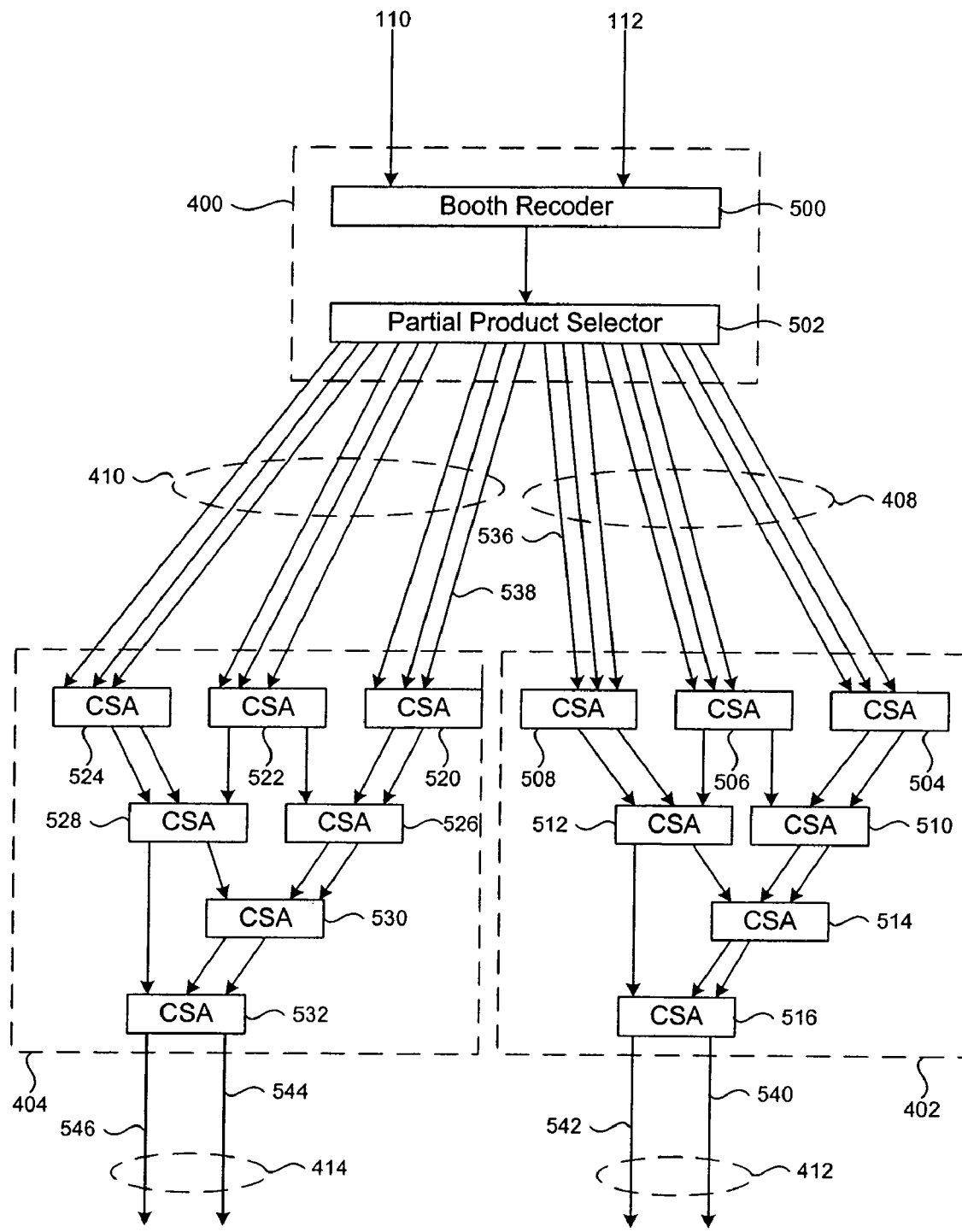
FIG. 5A-5B are more detailed schematic diagrams of the multiplier of FIG. 4.
Figure 5B:
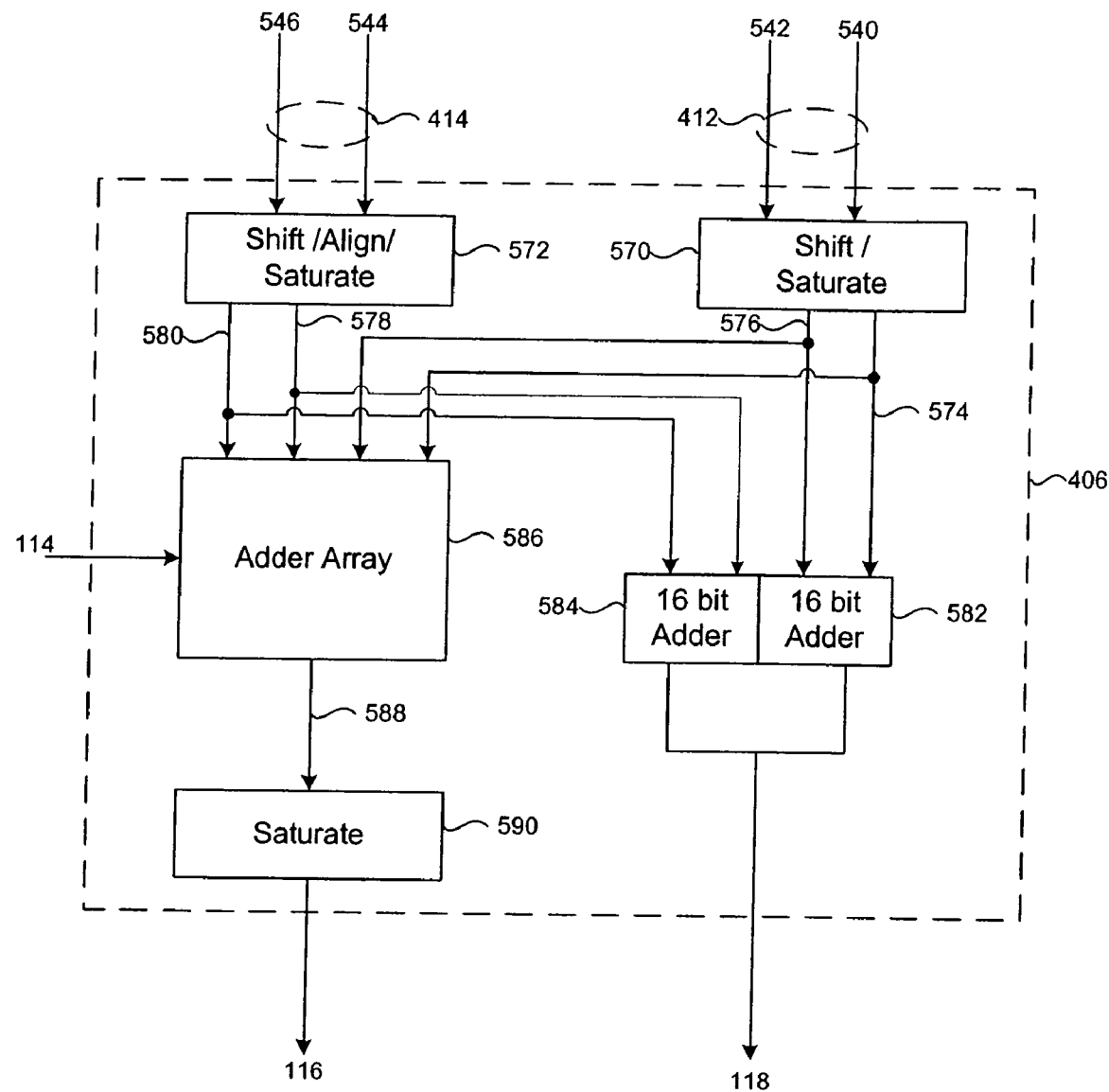

FIG. 5A-5B are detailed schematic diagrams of multiplier 106. More specifically, FIG. 5A provides greater detail of partial product generator 400 and adder arrays 402 and 404. FIG. 5B provides greater detail of combiner 406.

Referring to FIG. 5A, partial product generator 400 includes a Booth recoder 500 and a partial product selector 502. Booth recoder 500 generates Booth recoded values 534. These values include Booth recoded multipliers and Booth recoded partial product values for either vector values or single values represented by operands 110 and 112.

To better understand the present invention, consider an example of long hand multiplication. Long hand multiplication generates a product of two n-bit binary numbers. For each bit in the multiplier value, a 2n-bit partial product is generated. When the bit is a one value, this partial product contains a copy of the multiplicand value that is logically shifted toward the most significant bit (i.e., such that the least significant bit of the copy of the multiplicand value appears in the partial product at the position that the one bit value appears in the multiplier value). The copy of the multiplicand value may be sign extended when generating the partial product if the multiplicand value is signed. After all n partial products are created, one for each bit in the multiplier value, they are summed to generate a 2n-bit product of the two n-bit binary numbers.

A partial product can be referred to by its significance. The number of bits that a copy of the multiplicand value would be required to be shifted to generate a partial product for a one bit value in a multiplier value designates the significance of the partial product. Hence, a partial product that may potentially include a copy of the multiplicand value without requiring any shifting would have significance zero. Likewise, a partial product that may potentially include a copy of the multiplicand value shifted toward the most significant bit by 8 bits would have significance eight. Therefore, when there are several partial products in a set, the partial product that has the least significance is called the least significant partial product and the partial product that has the most significance is called the most significant partial product. If there are partial products with significance 0 to 15, the most significant partial product is the partial product with significance 15 and the least significant partial products is the partial product with significance 0.

In an embodiment, Booth recoding (e.g., one-bit Booth, two-bit Booth or bit-pair recoding, etc) can be used to reduce the number of partial products that are required to sum two n-bit binary numbers. Unlike the partial products of the long hand technique, which may contain either a zero value or a copy of the multiplicand value, a two-bit Booth recoded partial product may contain a value of zero or 1×M, 2×M, −1×M, and −2×M values (where M is the multiplicand value). Two-bit Booth recoding guarantees that every partial product with an odd numbered significance will have the value zero. Thus, two-bit Booth recoding requires only (floor(n/2)+1) partial products to generate the product of both signed and unsigned n-bit binary numbers (where floor(x) equals the greatest integer not exceeding x).

In an embodiment, to multiply two 32-bit single values, only seventeen Booth recoded partial products are needed. To multiply two 16-bit vector values, only nine Booth recoded partial products are needed. Therefore, each adder array 402 and 404 is implemented to sum nine partial products so that each adder array can produce a product of two 16-bit vector values. When both adder arrays 402 and 404 are used jointly, they sum up to eighteen partial products. Since only 17 Booth recoded partial products should be summed when multiplying two 32-bit single values, one of the eighteen partial products that are input to the two adder arrays 402 and 404 is assigned the value of zero.

In generating partial products for each adder array 402 and 404, Booth recoder 500 treats one of the operands 110 and 112 as the multiplier value and the other as the multiplicand value. When operands 110 and 112 represent vectors, Booth recoder 500 and partial product selector 502 create nine Booth recoded partial products for the product of the right vector values and assigns these partial products to adder array 402. In addition, Booth recoder 500 and partial product selector 502 create an additional nine Booth recoded partial products for the product of the left vector values and assigns them to the adder array 404.

When operands 110 and 112 each contain single values, Booth recoder 500 and partial product selector 502 create seventeen Booth recoded partial products for the single values and assigns the eight lowest significant Booth recoded partial products to adder array 402 and the nine highest significant Booth recoded partial products to adder array 404. In addition, the partial product selector 502 provides a partial product with a value of zero for a ninth partial product for adder array 402. The seventeen Booth recoded partial products may be divided among the two adder arrays 402 and 404 in different ways.

In an embodiment, adder arrays 402 and 404 are configured to include inputs that expect partial products with specific significance. Since a partial product with significance s contains only zero bit values between bit position s and the least significant bit, an adder array can be implemented to sum its inputs more efficiently by requiring each partial product input to be of a specific significance. By requiring each partial product input to be of a specific significance, the adder array avoids unnecessarily addition of portions of the partial products that are known to contain only zero bit values. Therefore, the adder array 402 is configured to accept partial products with significance 0, 2, 4, 6, 8, 10, 12, 14, and 16, and adder array 404 is configured to accept partial products with significance 16, 18, 20, 22, 24, 26, 28, 30, and 32. Partial product with significance 32 is only required to support unsigned values. With this configuration, the significance of the most significant partial product 536 for adder array 402 is equal to the significance of the least significant partial product 538 for adder array 404.

When operands 110 and 112 each contain single values, the significance of the seventeen Booth recoded partial products of the single values are 0, 2, 4, 6, 8, 10, 12, 14, 16, 18, 20, 22, 24, 26, 28, 30, and 32, and map to the inputs of adder arrays 402 and 404. So that the partial product with significance 16 is not added twice, the partial product selector 502 assigns a zero value to the most significant partial product 536 for adder array 402. Alternatively, partial product selector 502 may assign a zero value to the least significant partial product 538 for adder array 404.

When operands 110 and 112 contain vector values, the significance of the nine Booth recoded partial products are 0, 2, 4, 6, 8, 10, 12, 14, and 16 for both the products of left and right vector values. For the right vector values, the nine Booth recoded partial products map to the inputs of adder array 402. For the left vector values, the nine Booth recoded partial products are shifted 16 bits toward the most significant bit to map to the inputs of adder array 404. After adder array 404 adds the nine Booth recoded partial products for the left vector values, the result may be shifted 16 bits toward the least significant bit to remove the effect of the initial 16 bit shift toward the most significant bit.

In an embodiment, adder array 402 is implemented as an array of rows of carry-save adders 504, 508, 506, 508, 510, 512, 514, and 516. Adder array 404 is implemented as an of an array of rows of carry-save adders 520, 522, 524, 526, 528, 530, and 532. Carry-save adders take three inputs and produces two outputs referred to as the carry and the save. Adder array 402 takes as input nine partial products and outputs a final carry value 542 and a final save value 540. Adder array 404 takes as input nine partial products and outputs a final carry value 546 and a final save value 544.

Referring to FIG. 5B, in an embodiment, combiner 406 includes shift-saturate units 570 and 572, adder array 586, 16-bit adders 582 and 584, and saturation unit 590. Combiner 406 takes as its input carry values 542 and 546, save values 540 and 544, and the value represented by operand 114 to combine them in different ways to support various operations.

Shift-saturate units 570 and 572 shift and/or saturate inputs from adder arrays 402 and 404 respectively. The carry value 542 and save value 540 are shifted and/or saturated by shift-saturate unit 570, for example, if they represent fractional values. Shift-saturate unit 570 outputs carry value 576 and save value 574 Similarly, carry value 546 and save value 544 are shifted and/or saturated by shift-saturate unit 572, for example, if they represent fractional values. Furthermore, when operands 110 and 112 represent vectors, carry value 546 and save value 544 may be shifted toward the least significant bit to match the bit significance of carry value 576 and save value 574. This is done so that the decimal points of the carry values 546 and 542 and save values 544 and 540 are properly aligned and can be added to generate the dot product. Shift-saturate unit 572 outputs carry value 580 and save value 578.

When operands 110 and 112 each represent single values, carry values 580 and 576 and save values 578 and 574 are added by adder array 586 to support MULT type operations. Furthermore, carry values 580 and 576 and save values 578 and 574 are added with the value represented by operand 114 by adder array 586 to support MAQ type operations. Result 588 of adder array 586 may be saturated by saturation unit 590 if the accumulated value overflows or underflows. After result 588 is processed by saturation unit 590, final result 116 is provided by combiner 406 and is stored in one of accumulation registers 108.

Table 1, shown below, provides exemplary pseudo code for a MULT type operation that can be implemented, for example, using processor core 100. In the pseudo code, an accumulation register is shown as a HI and LO portion. In an embodiment, this pseudo code is implemented by an instruction having a format as illustrated in FIG. 8A.

TABLE 1

Pseudo code for an exemplary MULT type operation.

Format: MULT rs, rt
Purpose: To multiply registers rs and rt and store the result in the accumulation register.
Description: ac ← ($rs_{31..0}$ * $rt_{31..0}$)
Operation:
MULT
  HI[ac]||LO[ac] ← (GPR[rs]$_{31..0}$ * GPR[rt]$_{31..0}$)

Table 2, shown below, provides exemplary pseudo code for a MAQ type operation that can be implemented, for example, using processor core 100. In an embodiment, this pseudo code is implemented by an instruction having a format as illustrated in FIG. 8B.

TABLE 2

Pseudo code for an exemplary MAQ type operation.

Format: MAQ_S.W.PHR ac, rs, rt
Purpose: To multiply one set of fractional vector element using full-size intermediate products and then accumulate into the specified accumulator register.
Description: ac ← sat32(ac + sat32($rs_{15..0}$ * $rt_{15..0}$))
Operation:
MAQ_S.W.PHR
  Setouflag(GPR[rs], GPR[rt], satcond)
  if satcond then
    temp ← 0x7FFFFFFF
  else
    temp ← (GPR[rs]$_{15..0}$ * GPR[rt]$_{15..0}$) << 1
  endif
  temp2 ← (HI[ac]||LO[ac]) + temp
  HI[ac]||LO[ac] ← temp2
function Setouflag(s, t, satcond)
  satcond ← ($s_{15..0}$ = 0x8000) and ($t_{15..0}$ = 0x8000)
endfunction Setouflag To support MULQ type operations, when operands 110 and 112 represent vectors, carry value 580 and save value 578 are summed by 16-bit adder 584. Carry value 576 and save value 574 are summed by 16-bit adder 582. The outputs of 16-bit adders 584 and 582 are combined to generate final result 118, which is ultimately stored in a register of GPRs 102.

Table 3, shown below, provides exemplary pseudo code for a MULQ type operation that can be implemented, for example, using processor core 100. In an embodiment, this pseudo code is implemented by an instruction having a format as illustrated in FIG. 8C.

TABLE 3

Pseudo code for an exemplary MULQ type operation.

Format: MULQ_RS.PH rd, rs, rt
Purpose: Multiply two vector fractional Q15 values with optional saturation.
Description: rd ← sat16($rs_{31..16}$ * $rt_{31..16}$) || sat16($rs_{15:0}$ * $rt_{15:0}$)
Operation:
MULQ_RS.PH
  Setouflag(GPR[rs], GPR[rt], satcond1, satcond2)
  if satcond1 then
    temp1 ← 0x7FFFFFFF
  else
    temp1 ← ((GPR[rs]$_{31..16}$ * GPR[rt]$_{31..16}$) << 1) + 0x8000
  endif
  if satcond2 then
    temp2 ← 0x7FFFFFFF
  else
    temp2 ← ((GPR[rs]$_{15..0}$ * GPR[rt]$_{15..0}$) << 1) + 0x8000
  endif
  GPR[rd] ← temp1$_{31..16}$ || temp2$_{31..16}$
function Setouflag(s, t, satcond1, satcond2)
  satcond1 ← ($s_{31..16}$ = 0x8000) and ($t_{31..16}$ = 0x8000)
  satcond2 ← ($s_{15..0}$ = 0x8000) and ($t_{15..0}$ = 0x8000)
endfunction Setouflag When operands 110 and 112 are vectors, a dot-product accumulate (DPA) operation (may be supported by having shift-saturate unit 572 shift carry value 546 and save value 544 to produce carry value 580 and save value 578, which match the bit significance of carry value 576 and save value 574. Once carry values 580 and 576 and save values 578 and 574 match in significance, so that their decimal points are aligned, they are added by adder array 586 with the value represented by operand 114 to provide DPA type operations.

Table 4, shown below, provides exemplary pseudo code for a DPA type operation that can be implemented, for example, using processor core 100. In an embodiment, this pseudo code is implemented by an instruction having a format as illustrated in FIG. 8D.

TABLE 4

Pseudo code for an exemplary DPA type operation.

Format: DPAU.H.QBL ac, rs, rt
Purpose: To generate the dot-product of two bytes from the left-aligned vector positions using full-size intermediate products, followed by a further addition of the resulting dot-product to the specified accumulator register.
Description: ac ← ac + dot-product(rs[i],rt[i])
Operation:
    temp1 ← (GPR[rs]$_{31..24}$ * GPR[rt]$_{31..24}$)
    temp2 ← (GPR[rs]$_{23..16}$ * GPR[rt]$_{23..16}$)
    HI[ac]||LO[ac] ← HI[ac]||LO[ac] + temp1$_{15..0}$ + temp2$_{15..0}$ To support multiply-difference accumulate (MULSAQ) type operations, the present invention inverts the sign bits when Booth recoding the product of one of the vector values. Inverting the sign bits during Booth recoding is referred to herein as negated Booth recoding. To perform negated Booth recoding, both the −2×M and 2×M values and the −1×M and 1×M values are swapped in generating the Booth recoded partial products. The sum of the negated Booth recoded partial products produces the negative value of the product of the multiplier value and the multiplicand value.

In supporting a MULSAQ type operation, Booth recoder 500 and partial product selector 502 generate negated Booth recoded partial products for the right vector values. For the left vector values, Booth recoder 500 and partial product selector 502 generate normal Booth recoded partial products. Thereafter, the generated partial products are operated on by multiplier 106 as though it were performing a DPA operation. Since the right vector values are recoded using negated Booth recoding, the negative value of the product of the right vector values will be added to the product of the left vector values, thereby producing a multiply-difference result. The multiply-difference result can be added with the value represented by operand 114 to produce a result 116, which is stored in one of accumulation registers 108.

Table 5, shown below, provides exemplary pseudo code for a MULSAQ type operation that can be implemented, for example, using processor core 100. In an embodiment, this pseudo code is implemented by an instruction having a format as illustrated in FIG. 8E.

TABLE 5

Pseudo code for an exemplary MULSAQ type operation.

Format: MULSAQ_S.W.PH ac, rs, rt
Purpose: To multiply and subtract two fractional vector elements using full-size intermediate products and then accumulate into the specified accumulator register.
Description: ac ← ac + (sat32(rs$_{31..16}$ * rt$_{31..16}$) − sat32(rs$_{15..0}$ * rt$_{15..0}$))
Operation:
MULSAQ_S.W.PH
    Setouflag(GPR[rs], GPR[rt], satcond1, satcond2)
    if satcond1 then
        temp1 ← 0x7FFFFFFF
    else
        temp1 ← (GPR[rs]$_{31..16}$ * GPR[rt]$_{31..16}$) << 1
    endif
    if satcond2 then
        temp2 ← 0x7FFFFFFF
    else
        temp2 ← (GPR[rs]$_{15..0}$ * GPR[rt]$_{15..0}$) << 1
    endif

TABLE 5-continued

Pseudo code for an exemplary MULSAQ type operation.

HI[ac]||LO[ac] ← (HI[ac]||LO[ac]) + (temp1 − temp2)
function Setouflag(s, t, satcond1, satcond2)
    satcond1 ← (s$_{31..16}$ = 0x8000) and (t$_{31..16}$ = 0x8000)
    satcond2 ← (s$_{15..0}$ = 0x8000) and (t$_{15..0}$ = 0x8000)
endfunction Setouflag To handle dot-product subtract accumulate (DPS) type operations, Booth recoder 500 and partial product selector 502 generate negated Booth recoded partial products for both left and right vector values. Thereafter, the generated partial products are operated on by multiplier 106 as though it were performing a DPA operation. Since vector values are recoded using negated Booth recoding, the negative value of the product of the right vector values and the negative value of the product of the left vector values will be generated. These negative values are added by combiner 406 with the value represented by operand 114 to produce a result 116, which is stored in one of accumulation registers 108.

Table 6, shown below, provides exemplary pseudo code for a DPS type operation that can be implemented, for example, using processor core 100. In an embodiment, this pseudo code is implemented by an instruction having a format as illustrated in FIG. 8F.

TABLE 6

Pseudo code for an exemplary DPS type operation.

Format: DPSU.W.QBL ac, rs, rt
Purpose: To generate the dot-product of two bytes from left-aligned vector positions using full-size intermediate products, followed by subtraction into the specified accumulator register.
Description: ac ← ac − dot-product(rs[i],rt[i])
Operation:
    temp1 ← (GPR[rs]$_{31..24}$ * GPR[rt]$_{31..24}$)
    temp2 ← (GPR[rs]$_{23..16}$ * GPR[rt]$_{23..16}$)
    HI[ac]||LO[ac] ← HI[ac]||LO[ac] − (temp1$_{15..0}$ + temp2$_{15..0}$)

In an embodiment where multiplier 106 is not required to operate on vectors containing two 16-bit unsigned values, multiplier 106 supports multiplication of single values and other vector formats (e.g., vectors containing two 16-bit signed values, vectors containing one 8-bit unsigned value and one 16-bit unsigned value, etc) utilizing only 17 partial products. In such an embodiment, adder array 402 is configured to accept eight partial products with significance 0, 2, 4, 6, 8, 10, 12, and 14. Adder array 404 is configured to accept nine partial products with significance 16, 18, 20, 22, 24, 26, 28, 30 and 32. Since the two adder arrays 402 and 404 support up to 17 partial products, the two adder arrays are used jointly to compute the product of signed or unsigned 32-bit single values. But, since adder array 402 is configured to receive only 8 partial products, it is unable to generate the product of two 16-bit unsigned vector values.

In an embodiment where multiplier 106 does not handle vectors containing two 16-bit unsigned vector values, multiplier 106 generates the product of an unsigned 16-bit vector value and an unsigned 8-bit vector value by selecting the 16-bit vector value as the multiplicand value. For example, when one of the operands 110 and 112 represent a vector with two 16-bit vector values and the other operand represents a vector with two 8-bit vector values, partial product generator 400 selects the 16-bit vector values as the multiplicand value and the 8-bit vector values as the multiplier value. Since only five partial products are required to produce a product when the multiplier value is an 8-bit unsigned value, each adder array unit 402 and 404 is able to generate the product of one unsigned 16-bit vector value and one unsigned 8-bit vector value. In supporting the multiplication of one unsigned 16-bit and one unsigned 8-bit value, the partial product generator 400 may need to swap operands 110 and 112. Furthermore, the partial product generator 400 may need to zero extend the partial products it generates.

Hence, in an embodiment where multiplier 106 does not handle vectors containing two 16-bit unsigned vector values, the multiplier 106 utilizes only adder array 404 to generate the product of two 16-bit unsigned vector values. For example, when operands 110 and 112 represent vectors each containing one 8-bit unsigned value and one 16-bit unsigned value, partial product generator 400 generates partial products for the 16-bit unsigned values for adder array 404 and generates partial products for the 8-bit unsigned values for adder array 402. Combiner 406 combines the results generated by adder arrays 404 and 402 in different ways to produce a final result 116 or 118 for various types of operations. To ensure that 16-bit unsigned vector values are operated only by adder array 404, the vector values may need to be swapped in partial product generator 400 and the results of adder arrays 402 and 404 may need to be swapped in combiner 406.

Table 7, shown below, provides exemplary pseudo code for a MULEU type operation that can be implemented, for example, using processor core 100. In an embodiment, this pseudo code is implemented by an instruction having a format as illustrated in FIG. 8G.

TABLE 7

Pseudo code for an exemplary MULEU type operation.

Format: MULEU_S.PH.QBL rd, rs, rt
Purpose: To multiply a pair of 8-bit vector values to a pair of 16-bit vector values with optional saturation.
Description: rd ← sat16($rs_{31..24}$ * $rt_{31:16}$) || sat16($rs_{23:16}$ * $rt_{15:0}$)
Operation:
MULEU_S.PH.QBL
   Setouflag(GPR[rs], GPR[rt], tempu, tempv, satcondu, satcondv)
   if satcondu then
      tempu ← 0xFFFF
   endif
   if satcondv then
      tempv ← 0xFFFF
   endif
   GPR[rd] ← $tempv_{15..0}$ || $tempu_{15..0}$
function Setouflag(s, t, tempu, tempv, satcondu, satcondv)
   tempu ← ($s_{23..16}$ * $t_{15..0}$)
   tempv ← ($s_{31..24}$ * $t_{31..16}$)
   satcondu ← tempu > 0xFFFF
   satcondv ← tempv > 0xFFFF
endfunction Setouflag The principles outlined in the embodiments of the present invention described herein may be applied to support vectors having more than two values. In such embodiments, a separate adder array unit is used to generate products for values of vectors and adder array units are used jointly to generate products for larger data types. In an embodiment, a 64-bit processor may support 64-bit single values and vectors containing two 32-bit values or four values that are 16-bit or lower. In such an embodiment, four separate adder array units may be utilized individually to generate up to four products of 16-bit or lower vector values. Furthermore, two of the adder array units may be used jointly to generate up to two products of 32-bit vector values. Finally, all four adder array units may be used jointly to generate the product of two 64-bit single values. Applying the technique of the present invention, a variety of GPP and DSP data formats, operand sizes and operations can be supported.

In an embodiment, multiplier 106 may be pipelined. Pipelining may produce data hazards in the pipeline as multiple operations are performed back to back. Such data hazards may be handled by forwarding intermediate and final results from one stage of the pipeline to another. Other techniques such as inserting stalls or bubbles into the pipeline may be utilized to overcome data hazards in a pipelined multiplier 106.

Figure 6:
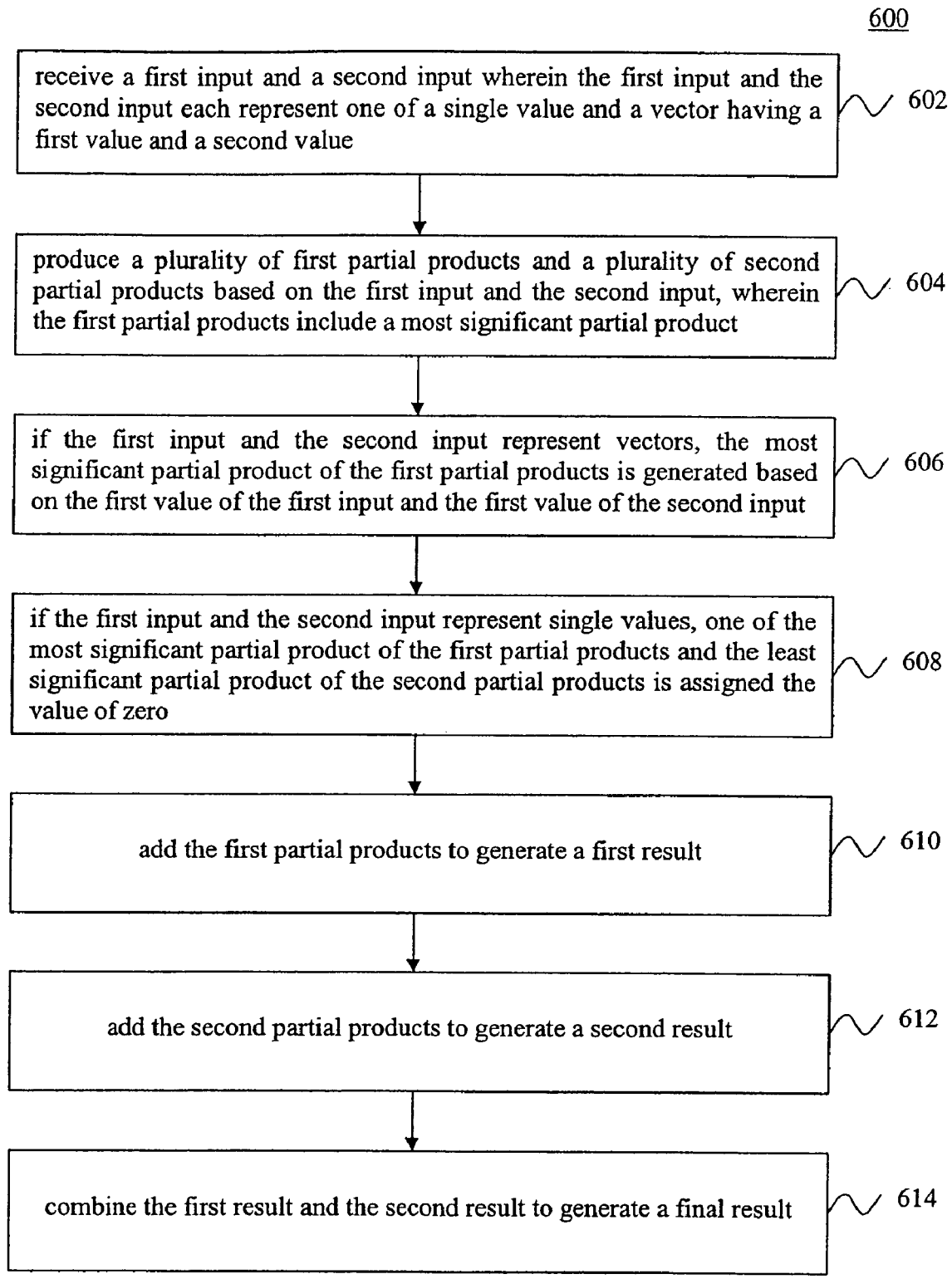
FIG. 6 is a flow chart illustrating the steps of a first method embodiment of the present invention.

FIG. 6 is a flow chart illustrating the steps of a method 600 for multiplying vectors and/or single values. Method 600 includes seven steps. Method 600 begins with step 602.

In step 602, a first input and a second input are received. The first input and the second input each represent either a single value or a vector having a first value and a second value. In an embodiment, the first input and second input may contain either fractional or integer values.

In step 604, a plurality of first partial products and a plurality of second partial products are produced. The first partial products and the second partial products may each include the partial products for a product of vector values or the partial products of the single values. The first partial products include a most significant partial product and the second partial products include a least significant partial product. In an embodiment, the significance of second partial products are greater or equal to the significance of first partial product.

In step 606, if the first input and the second input represent vectors, the most significant partial product of the first partial products is generated. This is based on the first vector value of the first input and the first vector value of the second input.

In step 608, if the first input and the second input represent single values, either the most significant partial product of the first partial products or the least significant partial product of the second partial products is assigned the value of zero. In one embodiment, one of the least significant partial products and most significant partial products of the first partial products and the second partial products is assigned the value of zero. In another embodiment, any one of the first partial products or the second partial products is assigned the value of zero.

In step 610, the first partial products are added to generate a first result.

In step 612, the second partial products are added to generate a second result.

In step 614, the first result and the second result are combined to generate a final result.

Figure 7:
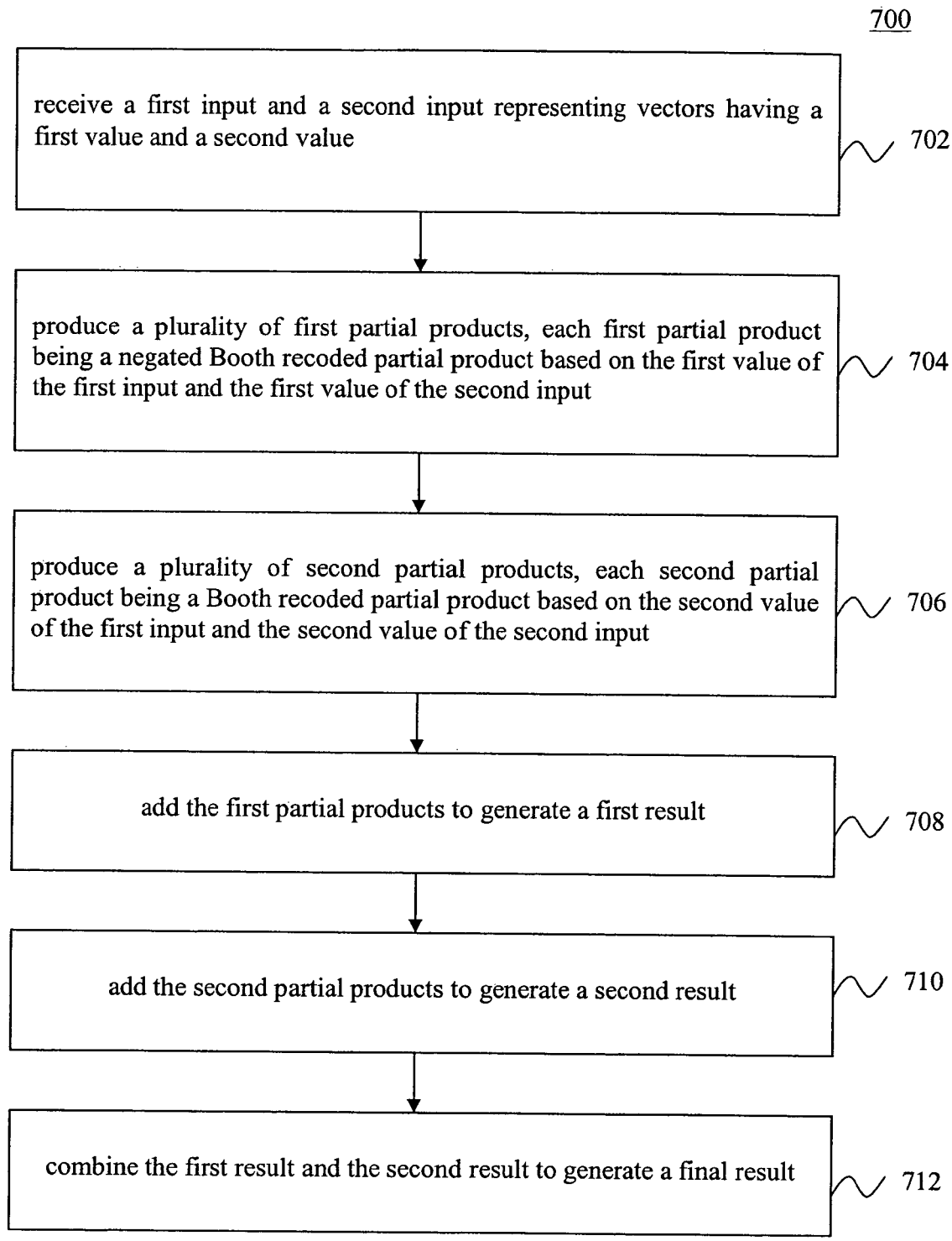
FIG. 7 is a flow chart illustrating the steps of a second method embodiment of the present invention.

FIG. 7 is a flow chart illustrating the steps of a method 700 for performing a multiply and subtract operation. Method 700 includes six steps. Method 700 begins with step 702.

In step 702, a first input and a second input representing vectors having a first value and a second value are received. In an embodiment, the first input and second input may contain either fractional or integer values In step 704, a plurality of first partial products are produced based on the first vector value of the first input and the first vector value of the second input. Each first partial product is a negated Booth recoded partial product. When the first partial products are summed, the result is the negative product of the first vector value of the first input and the first vector value of the second input.

In step 706, a plurality of second partial products are produced based on the second value of the first input and the second value of the second input. Each second partial product is a normal Booth recoded partial product. When the second partial products are summed, the result is the positive product of the second vector value of the first input and the second vector value of the second input.

In step 708, the first partial products are added to generate a first result.

In step 710, the second partial products are added to generate a second result.

In step 712, the first result and the second result are combined to generate a final result.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to multiplier implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor core to execute an instruction to perform both vector and single value multiplication, comprising:
    a plurality of general purpose registers;
    an accumulation register; and
    an execution unit, coupled to the general purpose registers and the accumulation register that includes:
        a partial product generator that generates a plurality of first partial products and a plurality of second partial products given a first input and a second input,
        a first adder array, coupled to the partial product generator, that generates a first result for the plurality of first partial products;
        a second adder array, configured in parallel with the first adder array, coupled to the partial product generator, that generates a second result for the plurality of second partial products; and
        a combiner, coupled to the first adder array and the second adder array, that generates a final result based on the first result and the second result, wherein
        if the first input and the second input represent single values, the partial product generator assigns a value of zero only to either a most significant partial product of the plurality of second partial products or to a least significant partial product of the plurality of first partial products.

2. The processor core of claim 1, wherein the partial product generator comprises:
    a recoder, and
    a partial product generator, coupled to the recoder,
    wherein if the first input and the second input represent vectors, the partial product generator generates the first partial products based on the first value of the first input, the first value of the second input and recoding, and generates the second partial products based on the second value of the first input, the second value of the second input and recoding.

3. The processor core of claim 1, wherein the first adder array and the second adder array comprise carry-save adders and the first result and the second result each contain a carry and a save, the combiner comprising:
    a first adder, coupled to the first adder array, that generates a third result based on the carry and the save of the first result; and
    a second adder, coupled to the second adder array, that generates a fourth result based on the carry and the save of the second result,
    wherein the third result and the fourth result are combined to generate the final result and stored in a first general purpose register.

4. The processor core of claim 1, wherein the combiner comprises:
    a shift unit, coupled to the first adder array and the second adder array,
    wherein if the first input and the second input each contain a fractional value, the shift unit shifts the first result and the second result by at least one bit.

5. The processor core of claim 4, wherein if the first input and the second input represent vectors, the shift unit shifts the second result so that the second result has the same bit significance as the first result.

6. The processor core of claim 4, wherein the combiner further comprises:
    a saturation unit, coupled to the shift unit, wherein
    if the first input and the second input represent single values each equal to negative one, the saturation unit replaces the first result with a first saturation result and the second result with a second saturation result,
    if the first input and the second input represent vectors and the first value of the first input and the first value of the second input each equal negative one, the saturation unit replaces the first result with a third saturation result, and
    if the first input and the second input represent vectors and the second value of the first input and the second value of the second input each equal negative one, the saturation unit replaces the second result with a fourth saturation result.

7. The processor core of claim 6, wherein the combiner further comprises:
    a third adder array, coupled to the saturation unit, generate the final result based on the first result, the second result, and a value stored in the accumulation register, the final result being stored in the accumulation register.

8. The processor core of claim 7, wherein the execution unit implements a multiply and accumulate instruction, wherein the first input and the second input are received from the general purpose registers, an accumulation value is received from the accumulation register and the final result is stored in the accumulation register.

9. The processor core of claim 7, wherein the execution unit implements a multiply, add, and accumulate instruction, wherein the first input and the second input are received from the general purpose registers, an accumulation value is received from the accumulation register and the final result is stored in the accumulation register.

10. The processor core of claim 7, wherein the execution unit implements a multiply vector instruction, wherein the first input and the second input are received from the general purpose registers and the final result is stored in one of the general purpose registers.

11. A computer readable storage medium having embodied thereon computer readable program code to generate a processor to perform a multiplication, the computer readable program code comprising:
first computer readable program code to generate a partial product generator that generates a plurality of first partial products and a plurality of second partial products given a first input and a second input, wherein the plurality of first partial products has a higher bit significance than the plurality of second partial products;
second computer readable program code to generate a first adder array, coupled to the partial product generator, that generates a first result for plurality of first partial products;
third computer readable program code to generate a second adder array, configured in parallel with the first adder array, coupled to the partial product generator, a second result for the plurality of second partial products; and
fourth computer readable program code to generate a combiner, coupled to the first adder array and the second adder array, that generates a final result based on the first result and the second result, wherein
if the first input and the second input represent single values, the partial product generator assigns a value of zero only to either a most significant partial product of the plurality of second partial products or to a least significant partial product of the plurality of first partial products.

12. The computer readable storage medium of claim 11, wherein the first computer program code for the partial product generator comprises:
fifth computer program code to generate a recoder, and
sixth computer program code to generate a partial product selector, coupled to the recoder,
wherein if the first input and the second input represent vectors, the partial product selector generates the first partial products based on the first value of the first input, the first value of the second input and recoding, and generates the second partial products based on the second value of the first input, the second value of the second input and recoding.

13. The computer readable storage medium of claim 11, wherein the second and third computer program code for the first adder array and the second adder array comprise carry-save adders and the first result and the second result each contain a carry and a save, the fourth computer program code for the combiner comprising:
fifth computer program code to generate a first adder, coupled to the first adder array, that generates a third result based on the carry and the save of the first result; and sixth computer program code to generate a second adder, coupled to the second adder array, that generates a fourth result based on the carry and the save of the second result,
wherein the third result and the fourth result are combined to generate the final result.

14. The computer readable storage medium of claim 11, wherein the fourth computer program code for the combiner comprises:
fifth computer program code to generate a shift unit, coupled to the first adder array and the second adder array,
wherein if the first input and the second input each contain a fractional value, the shift unit shifts the first result and the second result by at least one bit.

15. The computer readable storage medium of claim 14, wherein if the first input and the second input represent vectors, the fifth computer program code for the shift unit shifts the second result so that the second result has the same bit significance as the first result.

16. The computer readable storage medium program code of claim 14, wherein the fourth computer program code for the combiner further comprises:
fifth computer program code to generate a saturation unit, coupled to the shift unit, wherein
if the first input and the second input represent single values each equal to negative one, the saturation unit replaces the first result with a first saturation result and the second result with a second saturation result,
if the first input and the second input represent vectors and the first value of the first input and the first value of the second input each equal negative one, the saturation unit replaces the first result with a third saturation result, and
if the first input and the second input represent vectors and the second value of the first input and the second value of the second input each equal negative one, the saturation unit replaces the second result with a fourth saturation result.

17. The computer readable storage medium of claim 16, wherein the fourth computer program code for the combiner further comprises:
fifth computer program code for a third adder array, coupled to the saturation unit, that generates the final result based on the first result, the second result, and an accumulation value.

18. A multiplier in a hardware processor that supports both vector and single value multiplication in response to an instruction, comprising:
a partial product generator that generates a plurality of first partial products and a plurality of second partial products given a first input and a second input, wherein the plurality of first partial products has a higher bit significance than the plurality of second partial products;
a first adder array, coupled to the partial product generator, that generates a first result for the plurality of first partial products;
a second adder array, configured in parallel with the first adder array, coupled to the partial product generator, that generates a second result for the plurality of second partial products; and
a combiner, coupled to the first adder array and the second adder array, that generates a final result based on the first result and the second result, wherein
if the first input and the second input represent single values, the partial product generator assigns a value of zero only to either a most significant partial product of the plurality of second partial products or to a least significant partial product of the plurality of first partial products.

19. A multiplication method of executing an instruction to perform both vector and single value multiplication, comprising:

receiving a first input and a second input wherein the first input and the second input each represent one of a single value and a vector;

producing a plurality of first partial products, using a Booth recoder, and a plurality of second partial products based on the first input and the second input, wherein the plurality of first partial products has a higher bit significance than the plurality of second partial products, wherein if the first input and the second input represent single values, only either a most significant partial product of the plurality of second partial products or a least significant partial product of the plurality of first partial products is assigned the value of zero;

adding, using a first adder array, the plurality of first partial products to generate a first result;

adding, using a second adder array, configured in parallel with the first adder array, the plurality of second partial products to generate a second result; and combining, using a combiner coupled to the first and second adder array, the first result and the second result to generate a final result.

20. A processor multiplier to execute an instruction to perform both vector and single value multiplication, comprising:

a partial product generator that generates a plurality of first partial products and a plurality of second partial products given a first input and a second input;

a first adder array, coupled to the partial product generator, that generates a first result for the plurality of first partial products;

a second adder array, configured in parallel with the first adder array, coupled to the partial product generator, that generates a second result for the plurality of second partial products, the second adder array accepting an additional partial product directly from the partial product generator; and a combiner, coupled to the first adder array and the second adder array, that generates a final result based on the first result and the second result, wherein if the first input and the second input represent single values, the partial product generator assigns a value of zero only to either a most significant partial product of the plurality of second partial products or to a least significant partial product of the plurality of first partial products, and wherein a significance of the most significant partial product of the plurality of second partial products is equal to a significance of the least significant partial product of the plurality of first partial products.

21. The processor multiplier of claim 20, wherein the first input and second input represent vectors each containing two values, the values in the first input are represented with more bits than the values in the second input, and wherein the values in the first input are used as the multiplicand.

22. The processor core of claim 1, wherein a significance of the most significant partial product of the plurality of second partial products is equal to a significance of the least significant partial product of the plurality of first partial products.

* * * * *

UNITED STATES PATENT AND TRADEMARK OFFICE
CERTIFICATE OF CORRECTION

| | |
|---|---|
| PATENT NO. | : 8,234,326 B2 |
| APPLICATION NO. | : 11/121945 |
| DATED | : July 31, 2012 |
| INVENTOR(S) | : Chinh H. Tran |

It is certified that error appears in the above-identified patent and that said Letters Patent is hereby corrected as shown below:

<u>Column 15</u>
Line 28, please replace "for plurality" with --for the plurality--.

Signed and Sealed this
Eighteenth Day of December, 2012

David J. Kappos
*Director of the United States Patent and Trademark Office*